US007110400B2

(12) United States Patent
Hronik

(10) Patent No.: US 7,110,400 B2
(45) Date of Patent: Sep. 19, 2006

(54) RANDOM ACCESS MEMORY ARCHITECTURE AND SERIAL INTERFACE WITH CONTINUOUS PACKET HANDLING CAPABILITY

(75) Inventor: Stanley Hronik, Sunnyvale, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 321 days.

(21) Appl. No.: 10/120,648

(22) Filed: Apr. 10, 2002

(65) Prior Publication Data

US 2003/0193927 A1    Oct. 16, 2003

(51) Int. Cl.
    *H04L 12/28* (2006.01)
(52) U.S. Cl. .................. 370/389; 370/395.7; 370/412
(58) Field of Classification Search ................ 370/389, 370/474, 370, 379, 381, 382, 383, 412, 413, 370/415, 378, 395.7
    See application file for complete search history.

(56) References Cited

U.S. PATENT DOCUMENTS

| | | | |
|---|---|---|---|
| 5,249,185 A | 9/1993 | Kanno et al. | |
| 5,283,877 A | 2/1994 | Gastinel et al. | |
| 5,379,293 A * | 1/1995 | Kanno et al. ............... | 370/389 |
| 5,841,773 A * | 11/1998 | Jones ....................... | 370/236.1 |
| 5,862,128 A * | 1/1999 | Cooperman et al. ......... | 370/236 |
| 5,982,238 A | 11/1999 | Soderquist | |
| 6,276,844 B1 | 8/2001 | Coteus et al. | |
| 6,317,352 B1 | 11/2001 | Halbert et al. | |
| 6,345,321 B1 | 2/2002 | Litaize et al. | |
| 6,369,605 B1 | 4/2002 | Bonella et al. | |
| 6,425,064 B1 | 7/2002 | Soderquist | |
| 6,434,035 B1 | 8/2002 | Miersch et al. | |
| 6,480,409 B1 | 11/2002 | Park et al. | |
| 6,493,250 B1 | 12/2002 | Halbert et al. | |
| 6,502,161 B1 | 12/2002 | Perego et al. | |
| 6,553,450 B1 | 4/2003 | Dodd et al. | |
| 6,625,687 B1 | 9/2003 | Halbert et al. | |
| 6,643,752 B1 | 11/2003 | Donnelly et al. | |
| 2001/0049742 A1 * | 12/2001 | Steely et al. ................ | 709/232 |
| 2002/0112119 A1 | 8/2002 | Halbert et al. | |
| 2002/0124153 A1 | 9/2002 | Litaize et al. | |
| 2002/0129215 A1 | 9/2002 | Yoo et al. | |
| 2002/0144071 A1 | 10/2002 | Williams et al. | |
| 2003/0012229 A1 | 1/2003 | Braun | |
| 2003/0018880 A1 | 1/2003 | Litaize et al. | |
| 2003/0061447 A1 | 3/2003 | Perego et al. | |
| 2003/0074490 A1 | 4/2003 | Pochmuller | |
| 2003/0117172 A1 | 6/2003 | Wu et al. | |
| 2003/0120895 A1 | 6/2003 | Litaize et al. | |

* cited by examiner

*Primary Examiner*—Huy D. Vu
*Assistant Examiner*—Daniel Ryman
(74) *Attorney, Agent, or Firm*—Finnegan, Henderson, et al.

(57) ABSTRACT

A random access memory architecture and method of handling data packets is described. According to embodiments of the invention, an apparatus includes a first processing unit for receiving serial data input, a switch, and a plurality of serially connected random access memory devices. The random access memory devices transmit data packets and commands via write input ports, write output ports, read input ports, and read output ports. A method for routing data includes receiving serial data input in a first processing unit, generating a data packet based on the serial data input, transmitting the data packet to a first random access memory device via a write input port, decoding the data packet, determining whether to perform a command in the first random access memory device based on information in the data packet, and transmitting the data packet to a second random access memory device.

66 Claims, 12 Drawing Sheets

| | | |
|---|---|---|
| SOF | Start of Frame indicates new control word | 702 |
| CNTL | 2 bits control plus 6 Chip Select bits | |
| ADDR | 8 bits address | |
| ADDR | 8 bits address | |
| ADDR | 8 bits address | |
| Data | Write Data | |
| Data | Write Data | |
| SOF | Start of Frame indicates new control word | 704 |
| CNTL | 2 bits control plus 6 Chip Select bits | |
| ADDR | 8 bits address | |
| ADDR | 8 bits address | |
| ADDR | 8 bits address | |
| Data | Write Data | 702 (Cont'd) |
| Data | Write Data | |
| Data | Write Data | |
| Data | Write Data | |
| Data | Write Data | |
| Data | Write Data | |
| SOF | Start of Frame indicates new control word | |
| CNTL | 8 bits control = Stop Write | |

*FIG. 7*

| | | |
|---|---|---|
| 800 | SOF | Start of Frame indicates data boundary |
| | Data | Read Data |
| | Data | Read Data |
| | Data | Read Data |
| | Data | Read Data |
| | Data | Read Data |
| | Data | Read Data |
| | Data | Read Data |
| | Data | Read Data |
| | SOF | Start of Frame indicates data boundary |
| | Data | Read Data |
| | Data | Read Data |
| | Data | Read Data |
| | Data | Read Data |
| | Data | Read Data |
| | Data | Read Data |
| | Data | Read Data |
| | IDLE | No more data |

*FIG. 8*

| | | |
|---|---|---|
| SOF | Start of Frame for write | 902 |
| CNTL | Indicate Write and which device | |
| ADDR | 8 bits address | |
| ADDR | 8 bits address | |
| ADDR | 8 bits address | |
| Data | Write Data | |
| Data | Write Data | |
| Data | Write Data | |
| Data | Write Data | |
| SOF | Start of Frame for Stop Write | |
| CNTL | Stop write (data can be written to memory) | |
| SOF | Start of Frame for READ | 904 |
| CNTL | Indicate Read and which device | |
| ADDR | 8 bits address | |
| ADDR | 8 bits address | |
| ADDR | 8 bits address | |
| SOF | Indicates new transaction (go do the read now) | |
| CNTL | Indicate Stop Reading (four bytes read) | |

FIG. 9

Write Input Port

| | | 1002 | | | | | 1004 | | | | |
|---|---|---|---|---|---|---|---|---|---|---|---|
| SOF | CNTL | ADDR | ADDR | ADDR | SOF | CNTL | ADDR | ADDR | ADDR | SOF | CNTL |
| Start of Frame for new read | Indicate Read and which device | 8 bits address | 8 bits address | 8 bits address | Start of Frame for following READ | Indicate Read and which device | 8 bits address | 8 bits address | 8 bits address | Start of Frame for control word | Indicate Stop Reading |

*FIG. 10a*

| Read Output Port | |
|---|---|
| ?? | Previous operation in progress |
| ?? | Previous operation in progress |
| ?? | Previous operation in progress |
| ?? | Previous operation in progress |
| ?? | Previous operation in progress |
| ?? | Previous operation in progress |
| ?? | Previous operation in progress |
| ?? | Previous operation in progress |
| SOF | Start of Frame indicates data boundary — 1002 |
| Data | Read Data |
| Data | Read Data |
| Data | Read Data |
| Data | Read Data |
| SOF | Start of Frame indicates data boundary — 1004 |
| Data | Read Data |
| Data | Read Data |
| Data | Read Data |
| Data | Read Data |
| IDLE | No more data |

*FIG. 10b*

RANDOM ACCESS MEMORY ARCHITECTURE AND SERIAL INTERFACE WITH CONTINUOUS PACKET HANDLING CAPABILITY

BACKGROUND

As the need for bandwidth expands in information and communication networks, bottlenecks develop in the switching hardware due to increases in the number of ports and throughput per port in routing. To handle the increased bandwidth, architectures arose that rely upon increased internal bus widths, increased bandwidths on the busses, and decentralized processing. A block diagram of an example of the architecture of a known router system 100 is shown in FIG. 1. Incoming packets can be temporarily stored in a local buffer 102 until one or more network layer processors, shown as application specific integrated circuits (ASICs) 104 and 106, classifies and determines the forwarding address of the packet. The packets are then routed to the target destination.

Buffer 102 includes gigabytes of SRAM arranged in a very wide data bus (512 bits or more) 108 to allow several simultaneous search operations. Router system 100 analyzes the headers of incoming packets for the appropriate types of operations to be performed on the packet. In the case of TCP/IP route look-up, for example, router system 100 matches a combination of source/destination addresses with entries in a routing table for an exact match or a longest prefix match. Content addressable memory (CAM) 110 offloads ASIC 104 by processing a limited set of lookup instructions. In other applications such as load balancing and URL routing, router system 100 performs more complex search rules and routing data structures.

A successful search will result in router system 100 modifying the header and optionally, the payload, with new information. A packet header may be modified for its output port/queue, output connection, or additional labels for switching, for example. The packets are then queued by priority as well as latency to absorb the time needed to implement the search/modify steps. Output queuing reorders packets in the event multiple packets are searched in parallel.

In the example shown in FIG. 1, data bus 108 is a 640 bit bus with a speed of 133 MHz or 167 MHz. Greater efficiency can be achieved with large data packets, while transfers over data bus 108 are very inefficient for small data packets. ASICS 104 and 106 have a pin count of over 1000 pins. The number of pins cannot be expanded without changing ASICs 104, 106. The bandwidth of router system 100 is therefore limited.

If an ASIC with an expanded number of pins is used, other problems arise which increase production costs and limit scalability of router system 100. For example, the memory interface presents board layout problems, including positioning components to avoid long data bus lines; routing wide data bus lines to memory and processor devices with a large number of pins; and multidrop connections on all busses. Other problems include limited bandwidth per pin, and limited memory access time. Additionally, address fan-out problems arise with increasing address bandwidth and address loading and buffering. Further, noise issues arise with heavy bus loading and heavy bus drivers, line termination, bus contention, and the length of the data bus lines. There are also logistical problems with bus arbitration, transferring small amounts of data on very wide busses, bottlenecks at the memory interface, and bus/clock skew and bit alignment. Numerous memory devices switching on many pins at very high speed also dissipates a large amount of power. Additionally, because increasing bus widths, bus bandwidths, bus loading, ASIC size, and memory depth brings diminishing returns, router system 100 cannot efficiently be expanded to handle greater packet bandwidth.

It is therefore desirable to provide a router that is cost effective and scalable, and alleviates many of the problems listed above.

SUMMARY

According to an embodiment of the invention, an apparatus may include a first processing unit operable to receive serial data input, a switch operable to receive data to be transmitted, a first random access memory device coupled to the first processing unit via a write input port, wherein the first processing unit is operable to transmit data packets to the first random access memory device via the write input port, and a second random access memory device coupled to the first random access memory device, the second random access memory device being further coupled to transmit the data to be transmitted to the switch. The first and second random access memory devices may be configured as described in the embodiments below.

There may be a plurality of random access memory devices coupled between the first random access memory device and the second random access memory device, where each of the plurality of random access memory devices may be configured according to one of the embodiments described below. Each of the plurality of random access memory devices may be coupled in series to another of the plurality of random access memory devices. A write output port of each of the plurality of random access memory devices may be coupled to a write input port of the next of the series of the plurality of random access memory devices. A read output port of each of the plurality of random access memory devices may be coupled to a read input port of the next of the series of the plurality of random access memory devices. In some embodiments, each of the random access memory devices is operable to generate an overflow signal to indicate to the next random access memory device in the series that the data to be written or read is a continuation from the previous random access memory device. Each random access memory device may be operable to generate a command signal to indicate to the next random access memory device in the series that the continuation of data is to be written or read.

According to an embodiment of the invention, a random access memory device comprises a random access memory module, a write input port coupled to receive packets that include data and command information, a decoder coupled to receive the packets from the write input port, and to access the random access memory module to perform the commands in the packets, a read input port operable to receive bypass data, and a read output port coupled to output the bypass data and data read from the random access memory module.

The random access memory device may also include a write output port coupled to receive the packets from the write input port and to transmit the packets to another random access memory device. The random access memory device may also comprise a buffer coupled between the write input port and the write output port. The random access memory device may include a decoder between the write input port and the write output port, and an encoder coupled between the decoder and the write output port. The decoder may include a phase lock loop.

The random access memory device may also include a first multiplexer coupled between the read input port and the read output port, operable to output an idle signal when the read input port is not transmitting data to the read output port. The random access memory device may include a second multiplexer, coupled between the random access memory module and the read output port, where the second multiplexer is coupled to receive the output of the first multiplexer and to output the output of the first multiplexer when read data is not being transmitted from the random access memory module. The random access memory device may also include an encoder coupled between the random access module and the second multiplexer. The random access memory device may include a buffer coupled between the second multiplexer and the read output port. The random access memory device may also include a second decoder coupled between the read input port and the first multiplexer, wherein the second decoder includes a delay lock loop.

In some embodiments, the random access memory devices are operable to decode data packets and determine whether a data packet includes at least one of: a start of frame field, a control word, an address field, a data field, and an idle indicator. The control word may include at least one of: a command to be performed, and the random access memory device to perform the command.

According to an embodiment of the invention, a method for routing data includes receiving serial data input in a first processing unit, generating a data packet based on the serial data input, transmitting the data packet to a first random access memory device via a write input port, decoding the data packet, determining whether to perform a command in the first random access memory device based on information in the data packet, and transmitting the data packet to a second random access memory device, wherein a write input port of the second random access memory device is coupled in series to a write output port of the first random access memory device. The method may further include determining whether to perform a command in the second random access memory device based on the information in the data packet. The method may further include coupling a plurality of random access memory devices in series between the first random access memory device and the second random access memory device, wherein each of the plurality of random access memory devices includes a write input port, a write output port, a read input port, and a read output port, transmitting the data packet from the first random access memory device to each random access memory device, wherein the write output port of each random access memory device is coupled in series to the write input port of the next random access memory device, and determining whether to perform a command in each random access memory device based on the information in the data packet.

The method may further include generating an overflow signal in one of the plurality of random access memory devices to indicate to the next random access memory device that a write command or read command is being continued from the one of the plurality of random access memory devices. The method may further include terminating performance of a first write command when a second write command is received, when a read command is received, or when a stop write command is received.

The present invention may be better understood, and its numerous objects, features, and advantages made even more apparent to those skilled in the art by referencing the detailed description and accompanying drawings of the embodiments described below.

BRIEF DESCRIPTION OF THE DRAWINGS

FIG. 7 shows an example of a packet write interrupted by a packet read that can be processed by the SRAM devices of FIG. 3a or 3b.

FIG. 8 shows an example of a read data that can be output on the read output port of the SRAM devices of FIG. 3a or 3b in response to two read requests.

FIG. 9 shows an example of a packet write followed immediately by a packet read of the data that can be processed by the SRAM devices of FIG. 3a or 3b.

FIG. 10a shows an example of a read request for two minimum sized packets requested through the write input port.

FIG. 10b shows the output on the read port resulting from the read commands received in the packets of FIG. 10a.

DETAILED DESCRIPTION

Figure 1:
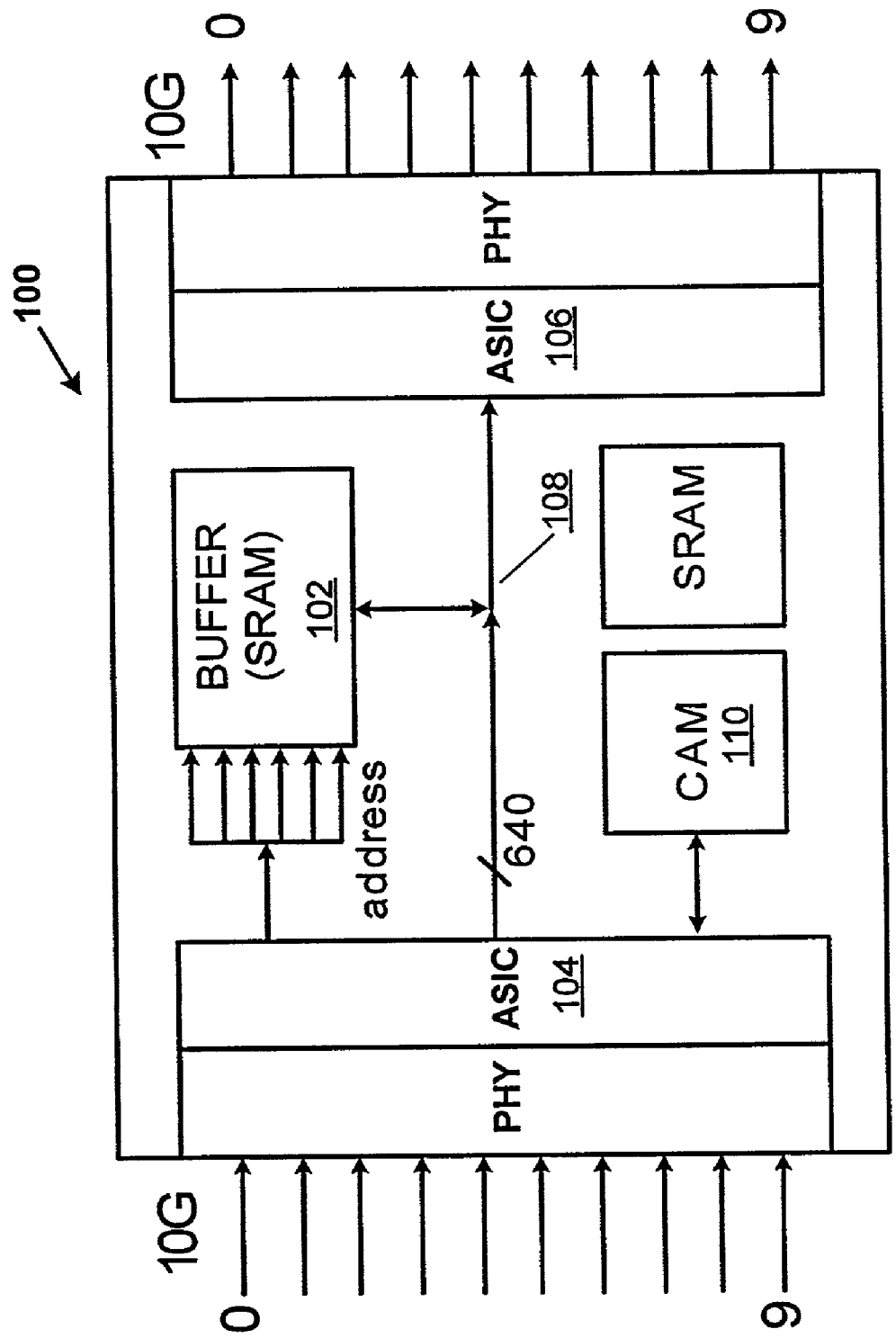
FIG. 1 is a block diagram of an example of components included in a high speed router known in the art.

A configuration of static random access memory (SRAM) devices in accordance with an embodiment of the present invention replaces the data bus 108 (FIG. 1) with high speed, point-to-point, serial data connections. Accordingly, the pin count on the controlling ASIC 104 (FIG. 1) can be significantly reduced while simultaneously achieving at least an order of magnitude increase in total bandwidth. Further, increasing the memory capacity of SRAM 102 (FIG. 1) adds bus loading on bus 108 and possibly extra pins on ASIC 104. Further, increasing the size and number of memory storage devices in SRAM 102 creates difficulties in routing bus 108 and address distribution. SRAM devices configured in accordance with an embodiment of the present invention allow an increase in the amount of memory without requiring additional pins on an ASIC and can be distributed serially in chains that are connected to the ASIC at both ends. Such a configuration simplifies real estate problems in the vicinity of the ASIC and alleviates problems associated with routing additional bus lines to ASIC 104. Further, the bandwidth per pin of an ASIC configured in accordance with embodiments of the present invention can be significantly increased, and memory reads and writes can occur simultaneously and continuously as further described hereinbelow.

Figure 2:
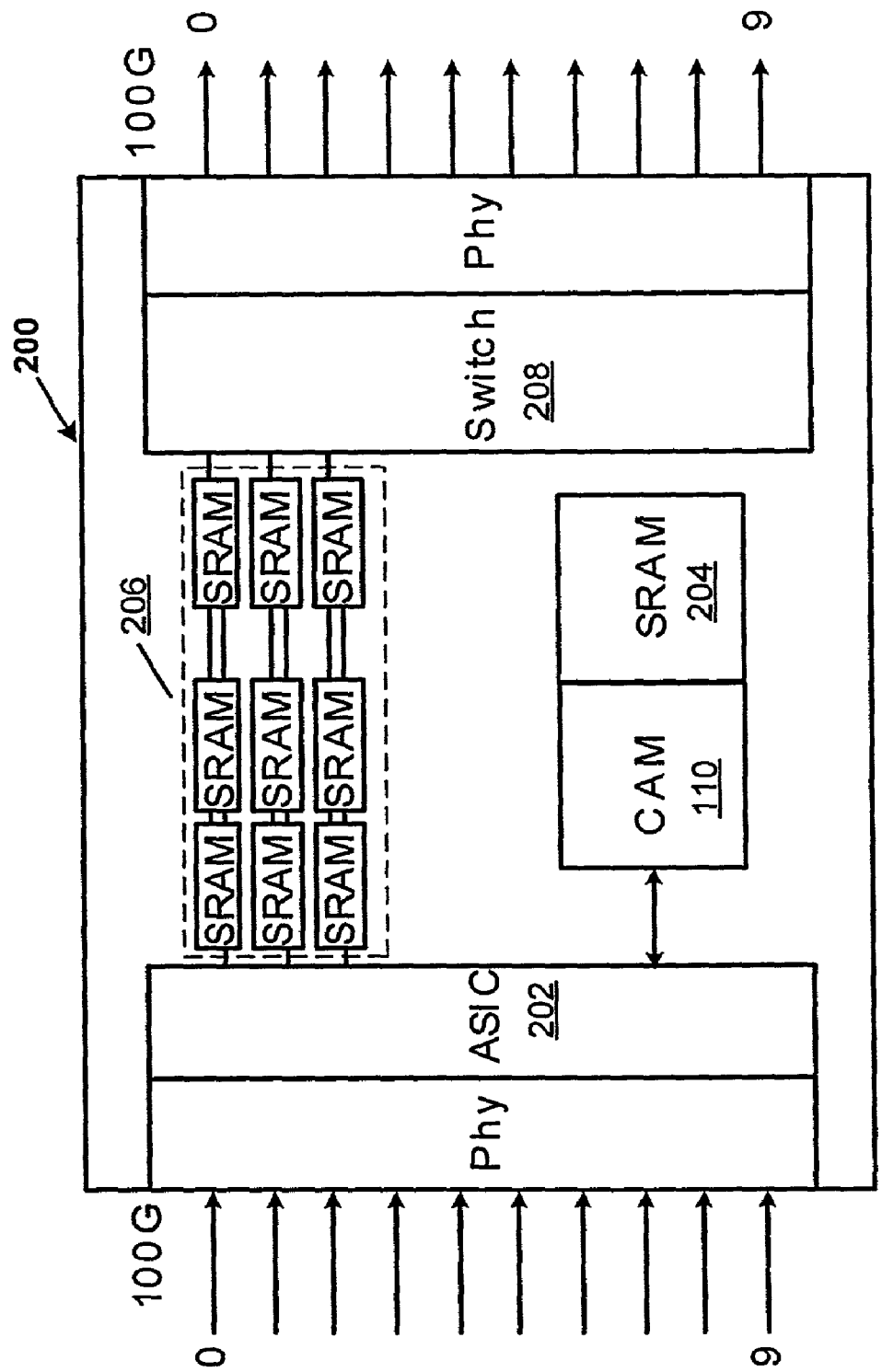
FIG. 2 is a block diagram of components included in a router according to an embodiment of the present invention.

Referring now to FIG. 2, a block diagram of components included in a router 200 according to an embodiment of the present invention is shown. Router 200 includes an ASIC 202, a CAM 110, SRAM devices 204 associated with CAM 110, a bank of SRAM devices 206, and a switch 208. Each physical input has a direct connection to ASIC 202. ASIC 202 transmits the header from each packet to CAM 110 for translation, and stores the rest of the packet, also referred to as the payload, in the bank of SRAM devices 206. The payload remains in the bank of SRAM devices 206 until CAM 110 returns the header with the new routing information for the packet to ASIC 202. ASIC 202 retrieves the payload, combines the new header with the corresponding payload, and transmits the packet to switch 208 via the bank of SRAM devices 206.

Figure 3A:
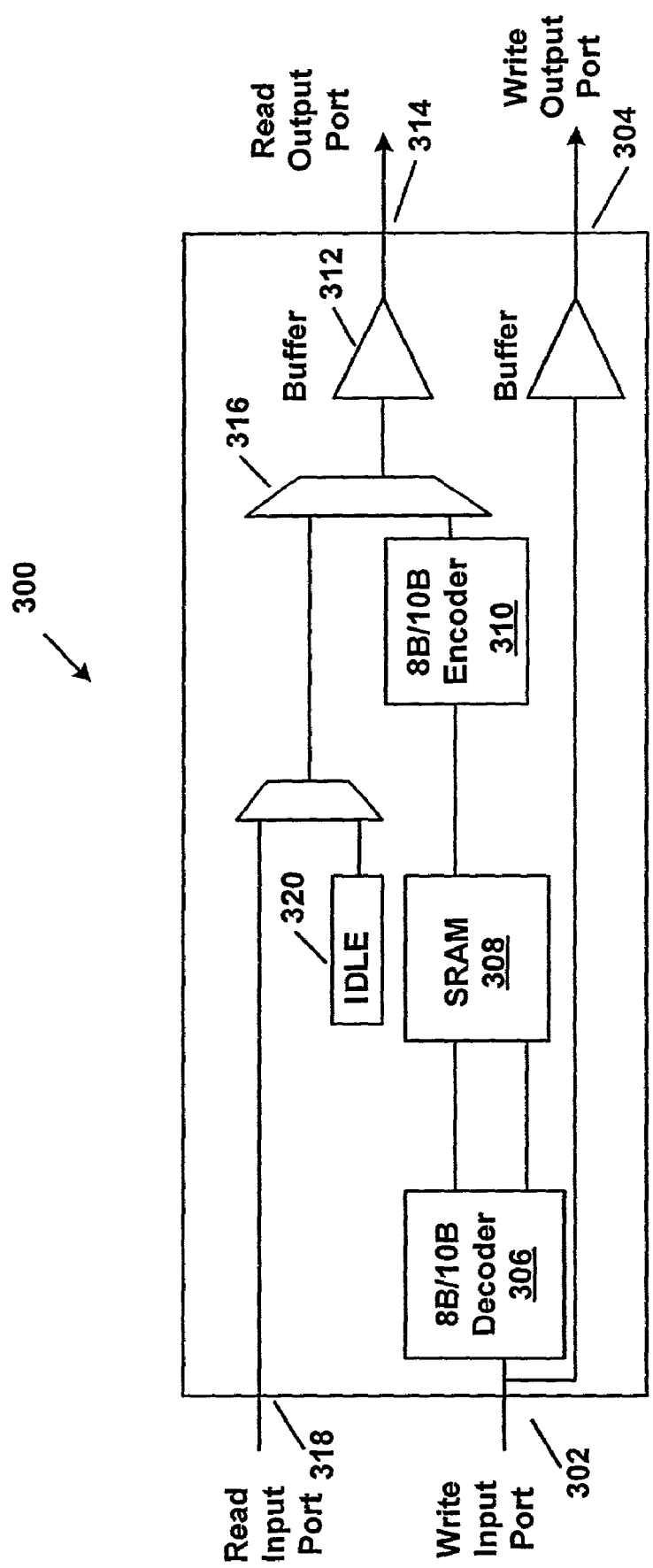
FIG. 3a is a block diagram of an example of a SRAM device that can be utilized in the router of FIG. 2.

FIG. 3a is a block diagram of an embodiment of an SRAM device 300 that can be utilized in the bank of SRAM devices 206 of FIG. 2. In the embodiment shown, data is transmitted directly from a write input port 302 to a write output port 304 under all conditions. Control data, write data, and read requests are input to SRAM device 300 through write input port 302. When a valid write command is in progress, the packet is transmitted to a decoder and phase lock loop (PLL) 306. The data and the address where the data will be stored in an SRAM module 308 is decoded from the packet and transmitted to SRAM module 308, which stores the data.

When a read command is received in write input port 302, the data is retrieved from SRAM module 308 and transmitted to an encoder 310, a buffer 312, and read output port 314. When a read is in progress, a multiplexer 316 suspends transmission of bypass data through read input port 318 until the requested data from SRAM module 308 has been sent. When data is not being output on read output port 314, then bypass data is transmitted directly to read output port 314 via multiplexer 316 and buffer 312. If a read command is not in progress, and no bypass data is being transmitted (i.e., read input port 318 is not toggling), then an IDLE signal 320 is transmitted to read output port 314 via multiplexer 316 and buffer 312.

Figure 3B:
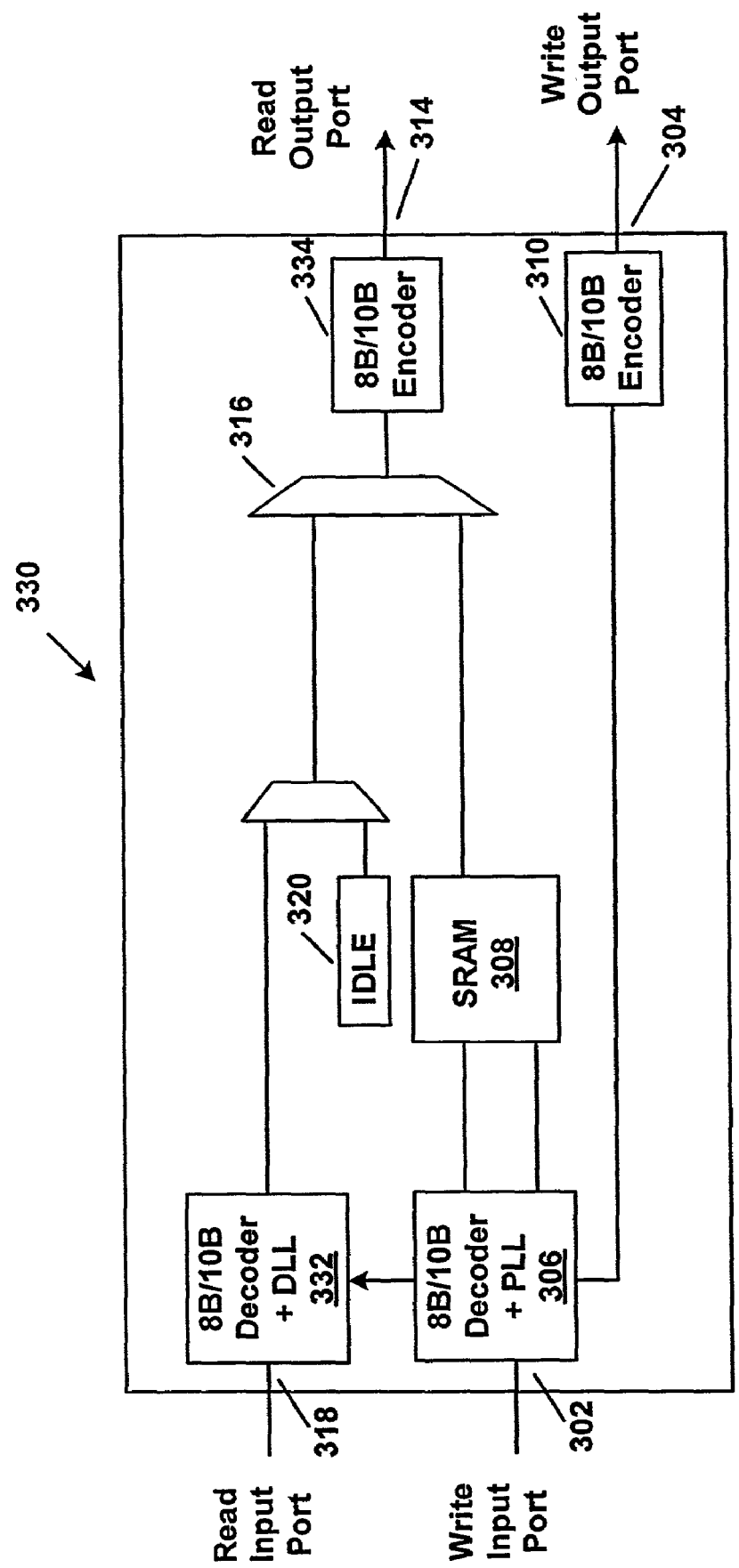
FIG. 3b is a block diagram of an alternate SRAM device that can be utilized in the router of FIG. 2.

FIG. 3b is a block diagram of another embodiment of an SRAM device 330 that can be utilized in the bank of SRAM devices 206 of FIG. 2. In the embodiment of SRAM device 330 shown in FIG. 3b, data is transmitted from write input port 302 to decoder and PLL 306, encoder 310, and then to write output port 304 under all conditions. Decoder and PLL 306 generates clock signals for a decoder and delay lock loop (DLL) 332 to correct the phase of the bypass data. The clock signals from decoder and PLL 306 are also used to clock the read output port 314 and the write output port 304, so that data transmitted from write output port 304 is synchronized with data transmitted from read output port 314. The timing is set up to be equal in both read and write paths of SRAM device 330, so that individual devices in a bank of SRAM devices (such as bank of SRAM devices 206 of FIG. 2) can insert data into the read data stream without interfering with data from other devices. When a valid write command is in progress, the data and the address where the data will be stored in SRAM module 308 is transmitted to SRAM module 308, which stores the data.

When a read command is received in write input port 302, the data is retrieved from SRAM module 308 and transmitted to an encoder 334 and read output port 314. When a read is in progress, multiplexer 316 suspends transmission of bypass data through read input port 318 until the requested data from SRAM module 308 has been sent. When data is not being output on read output port 314, then bypass data is transmitted to read output port 314 via decoder and DLL 332 and encoder 334. If no read command is in progress, and there is no bypass data being transmitted, then an IDLE signal 320 is transmitted to read output port 314 via decoder and DLL 332 and encoder 334.

Figure 4:
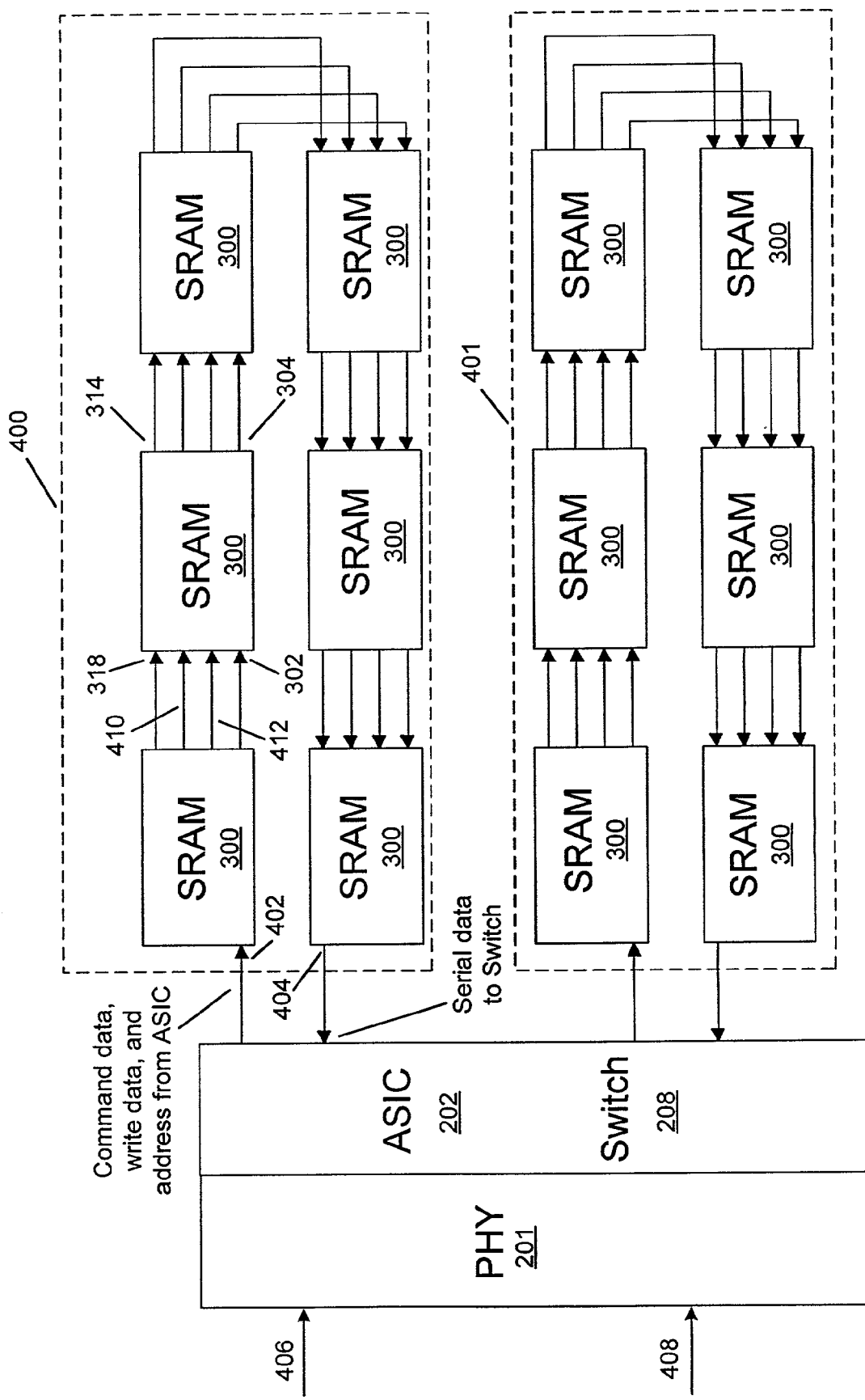
FIG. 4 is a block diagram showing an embodiment of a configuration of the bank of SRAM devices of FIG. 2.

FIG. 4 shows a block diagram of an embodiment of system memory architecture for one or more SRAM series 400, 401 that can be utilized in the bank of SRAM devices 206 of FIG. 2. Each SRAM series 400, 401 includes one write input port 402 to receive input from ASIC 202 and one read output port 404 to output read data to switch 208. Note that ASIC 202 and switch 208 are shown in the same component in FIG. 4 to illustrate the architecture of the SRAM series 400, 401. Additionally, multiple SRAM devices 300 (FIG. 3a) and SRAM devices 330 (FIG. 3b) can be utilized in SRAM series 400, 401, with SRAM devices 300 being shown as one possible configuration.

In the architecture shown, SRAM series 400 is dedicated to receiving and storing data from a serial input 406 and supplying the data to switch 208. Similarly, SRAM series 401 is dedicated to receiving and storing data from a serial input 408 and supplying the data to switch 208. Additional SRAM devices 300 can be added to a SRAM series 400, 401 to increase storage capacity without increasing the number of pins on ASIC 202. Further, additional SRAM series 400, 401 can be added to handle a corresponding number of additional serial inputs.

The read output ports 314 and the write output ports 304 of each SRAM device 300 are connected to the read input port 318 and write input port 302, respectively, of the next SRAM device 300 in the SRAM series 400, 401. Notably, SRAM devices 300 can be added or removed from the SRAM series 400, 401 to meet latency requirements. For example, in one embodiment, a series of fifty-two (52) eighteen (18) Megabit SRAM devices 300 is required to reach a latency of 300 milliseconds.

In some embodiments, SRAM devices 300 and 330 are configured to manage overflow data. If the amount of data to be written is larger than the amount of memory space available in the SRAM device 300 specified in the CNTL word, the data overflows to the next SRAM 300 in the SRAM series 400, 401. In this manner, the data from a packet is stored in a contiguous block that can span portions of one or more SRAM devices 300. When a read operation, such as the read operation illustrated in FIG. 8, would access the last data word in one of the SRAM devices 300 but the read operation is not halted, an overflow occurs. An overflow signal on a connection such as connection 410 can indicate to the next SRAM device 300 or 330 in the SRAM series 400, 401 that the read operation should continue in the subsequent device starting at the lowest address. In SRAM devices 300 or 330, connection 410 (as an output) indicates that the address at the SRAM is at terminal count. Connection 410 (as an input) indicates that the SRAM address should be set to zero and incremented from there.

Similarly, an overflow signal on a connection such as connection 412 can indicate that an overflow occurs during a write operation. When a write operation, such as the write operation illustrated in FIG. 6, would write to the last data word in an SRAM device 300, but the write operation is not halted, the overflow signal on connection 412 would indicate to the next SRAM device 300 in the SRAM series 400, 401 that the write operation should continue in the subsequent device starting at the lowest address. In SRAM device 300 or 330, connection 412 (as an output) would be an indication that the address at the SRAM is at terminal count. Connection 412 (as an input) would indicate that the SRAM address should be set to zero and incremented from there. This method of managing overflow is referred to as cascading first-in-first-out (FIFO). Notably, the overflow signal on connection 410 or connection 412 also indicates that the data should be read from or written to the beginning of the memory in the SRAM device 300, thereby alleviating the need for ASIC 202 to supply a new address or device selection to the next SRAM device 300.

Figure 5:
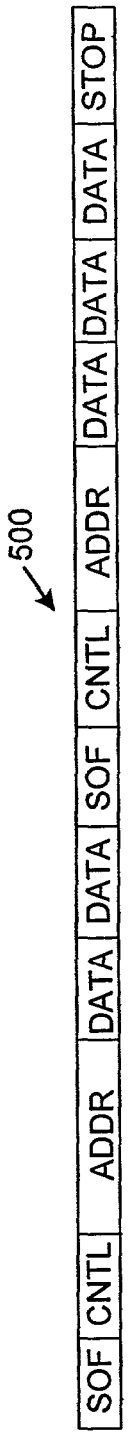
FIG. 5 shows an example of an address and data format for two packets that can be processed by the SRAM devices of FIG. 3a or 3b.

FIG. 5 is an example of an address and data format for a packet 500 that can be processed by the SRAM devices 300, 330 of FIG. 3a or 3b. When packet 500 is input to the write input port 302, the start of frame (SOF) parameter initiates a read or write transaction by apportioning the data in one or more frames and synchronizing the serial bit stream. In one embodiment, the control (CNTL) word includes 8 bits that can be set to one of several read or write modes. For example, two bits can be set to command the following read or write modes:

| | |
|---|---|
| 00 | READ until stop command |
| 01 | WRITE until stop command |
| 10 | STOP command (remaining 6 bits in the CNTL word are set to indicate: |
| | 000000 Stop Write |
| | 100000 Stop Read) |
| 11 | READ UNTIL STOP WITH DATA TAGGING command |

Note that an address is not required for the STOP command. For the READ and WRITE commands, the remaining 6 bits in the CNTL word can also be used to select a SRAM device 300 (FIG. 3). This allows up to 64 SRAM devices 300 to be cascaded. A greater or lesser number of bits can be included in the CNTL word to accommodate any number of SRAM devices 300, as required by a particular implementation.

In the embodiment shown, the address (ADD) field includes 24 bits that are set to indicate the starting location of the data to be read or written when a READ or WRITE command is input. A minimum amount of memory space, such as 1 byte, can be allocated to each address. Other amounts of minimum memory space and number of bits in the address field can be implemented.

If a 'READ UNTIL STOP WITH DATA TAGGING' command is input, a number of bits in each DATA field can be used to store the data tag. For example, in one implementation, 16 bits of the DATA field are used to store tag information, such as a sequence number identifying the data to subsequent devices.

When the WRITE command is received, data is written into one or more of the SRAM devices 300, 330 (FIGS. 3a and 3b) until the end of the data is reached. The WRITE command can be suspended when the STOP WRITE command is detected.

Figure 6:
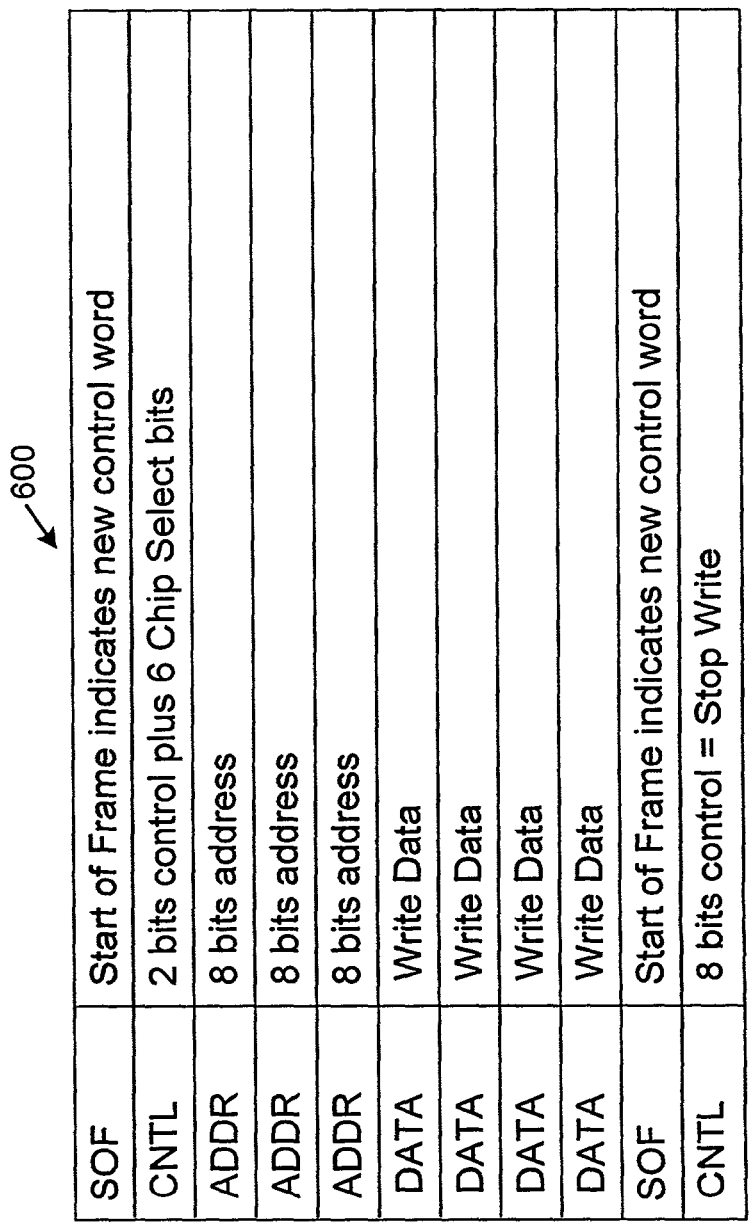
FIG. 6 shows an example of a packet write that can be processed by the SRAM devices of FIG. 3a or 3b.

FIG. 6 shows an example of a packet write that can be input to write input port 302 and processed by SRAM devices 300, 330 of FIG. 3a or 3b. Packet write 600 includes the SOF field to indicate the start of a new control word and initiate the transaction by framing the data and synchronizing the serial bit stream. The CNTL word indicates that the WRITE command is to be performed. A portion of the CNTL word can indicate the SRAM device 300 in the SRAM series 400, 401 (FIG. 4) into which the data will be written. The ADDR fields indicate the starting address in the SRAM device 300 in the SRAM series 400, 401 (FIG. 4) for writing the data. In one embodiment, each address requires a minimum of 32 bytes of address space. A variety of different size packets can be used within the same SRAM series 400, 401.

In some embodiments, the STOP WRITE command is performed when the command is detected in the CNTL word after the SOF field. A STOP WRITE can also be initiated by starting a new WRITE command. In such an embodiment, the WRITE command terminates all existing writes in all SRAM devices 300 in the SRAM series 400, 401 (FIG. 4). The SRAM device 300 specified in the CNTL word starts a new write transaction for the write data in the packet write 600.

According to some embodiments, both read and write operations may be performed in a bank of SRAM devices (such as bank of SRAM devices 206 of FIG. 2) at the same time. Referring now to FIG. 7, an example of a packet write 702 interrupted by a packet read 704 that can be processed by the SRAM devices 300, 330 of FIG. 3a or 3b is shown. In the example shown, the SOF field in packet read 704 indicates a new command. Specifically, the first two bits of the CNTL word indicate a READ command, and the remaining 6 bits indicate the SRAM device 300 (FIG. 4) from which the data is to be read. The address fields following the SOF field provide the address in the selected SRAM device 300 to begin reading the data. The SRAM device 300 will initiate a READ at the designated address and continue reading and transmitting the data to the READ output port 314 (FIG. 4) until a STOP READ command is received, or a new READ command is received. The SRAM device 300 resumes the WRITE command where it was interrupted. A SOF field and a CNTL word containing bits set to indicate a STOP WRITE command is included at the end of the packet write 702 to terminate the WRITE command, but the READ command 704 was not terminated and will continue.

FIG. 8 is an example of a read data stream 800 from two consecutive packet reads that can be output on the read output port 314 of the SRAM devices 300, 330 of FIG. 3a or 3b. The data from each READ command is delimited by a SOF field. The READ command continues to output data until a new read command interrupts the current read command or a STOP READ command is detected by the SRAM device 300, 330. For example, the read data stream 800 shows data from a first READ command, a SOF field to delimit the data from a second READ command, and an IDLE field at the end of the read data stream 800 to indicate that a STOP READ command was detected by the SRAM device 300, 330. Note that the read data stream 800 does not indicate whether a WRITE command was interrupted to perform the READ commands.

FIG. 9 is an example of a packet write 902 followed immediately by a packet read 904 that can be processed by the SRAM devices 300, 330 of FIG. 3a or 3b. Packet write 902 includes the SOF field to indicate the start of a new control word and initiate the transaction by framing the data and synchronizing the serial bit stream. The CNTL word indicates that the WRITE command is to be performed and the SRAM device 300 in the SRAM series 400, 401 (FIG. 4) into which the data will be written. The ADDR fields indicate the starting address in the specified SRAM device 300 for writing the data. The STOP WRITE command terminates the WRITE command once all of the data has been written to memory.

The packet read 904 begins with the SOF field to indicate a new command. Specifically, the first two bits of the CNTL word indicate a READ command, and the remaining 6 bits indicate the SRAM device 300 (FIG. 4) from which the data is to be read. The address fields following the SOF field provide the address in the selected SRAM device 300 to begin reading the data. The SRAM device 300 completes the READ command and transmits the data to the READ output port 314 (FIG. 3b). A SOF field is sent to indicate the start of a new transaction, and a STOP READ command in the CNTL word terminates the previous READ command.

In the example shown in FIG. 9, the minimum READ length is 4 bytes. Five byte transfers are required to initiate a READ command, (i.e., the SOF field, CNTL word, and address bytes in packet read 904). The READ output data will consist of five byte transfers minimum (i.e., the SOF field, and four data bytes), to correspond with the time needed to initiate a new read or a STOP READ command. The WRITE command terminates after the STOP WRITE command is detected, however, the data can be written to memory as the CNTL word in the read packet 904 is parsed. Notably, the data written by packet write 902 can be read by the consecutive packet read 904. Other embodiments may require longer or shorter minimum reads, depending upon the number of bytes of address required to complete a READ command, which can vary based on the amount of memory and the address granularity.

Referring now to FIGS. 10a and 10b, FIG. 10a shows an example of two minimum-sized sequential read packets 1002, 1004 to be input to the write input port 302 of the SRAM devices 300, 330 of FIG. 3a or 3b. FIG. 10b shows the output on the read output port 314 resulting from performing the read commands in the packet reads 1002, 1004 of FIG. 10a. Each packet read 1002, 1004 includes a minimum of four byte transfers (SOF field, CNTL word, and the address from which data is to be read). During frames 1–8, the first READ command is performed, and the beginning of the second READ command is beginning, as shown in FIG. 10a. The data from the first READ command becomes available after the 9th (ninth) frame, as shown in FIG. 10b. This example of sequential read packets 1002, 1004 shows the worst case time delay for the READ command.

Referring to FIGS. 3a, 3b, and 5, in some embodiments, to provide traceability of the read data, an extra CNTL word can be added to the data packet 500 to identify the data read from the SRAM module 308. The extra CNTL word can be used to indicate to the SRAM device 300, 330 that a data identifier is included in the packet, for example, following the read address. The identifier can be returned with the read data, and the amount of packet space allocated for the identifier, such as 16 bits, can be selected to meet the requirements of the system. In alternative embodiments, an identifier can be included in the data and the components of the system can be implemented to recognize the identifier by its format and/or location in the data stream.

Advantageously, some embodiments of SRAM device 300, 330 can write packets as small as one byte by performing a write request (5 bytes) and supplying one byte of data before the next write request. Read requests output a minimum of 5 bytes due to the fact that 5 bytes of address and control information are required to make the request on the write input port 302. Unused data can be discarded.

Figure 11A:
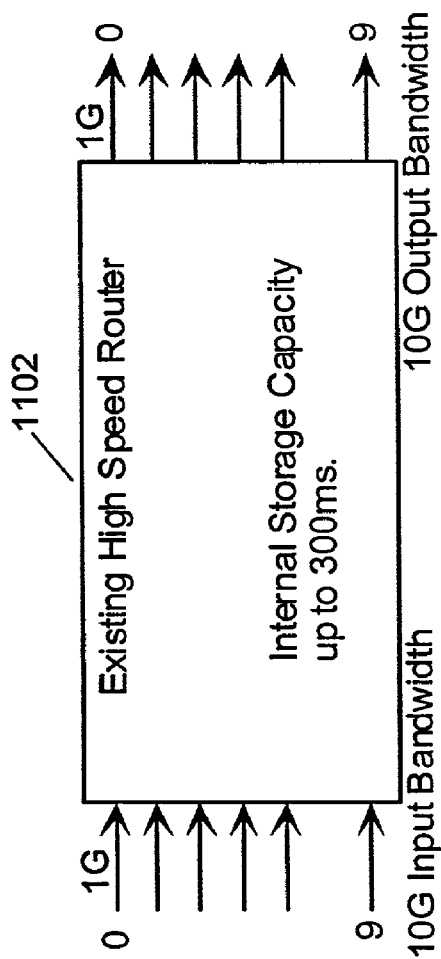
FIG. 11a shows an example of input and output bandwidths that can be achieved with a known high speed router.
Figure 11B:
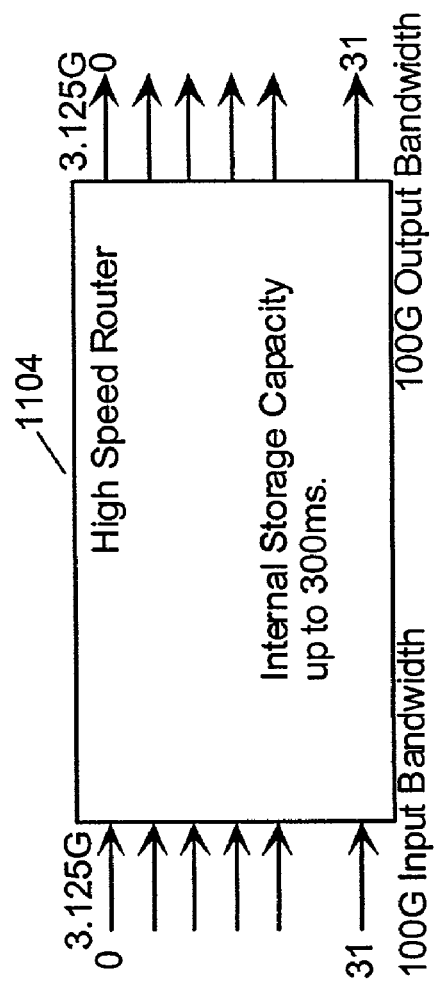
FIG. 11b shows an example of input and output bandwidth that can be achieved by a high speed router configured with SRAM devices of FIG. 3a or 3b.

Referring to FIGS. 11a and 11b, FIG. 11a shows an example of a known high speed router 1102 that indicates the input and output bandwidths that can be achieved by router 1102. In the example shown, the router 1102 has an internal storage capacity of up to 300 milliseconds, with input and output bandwidths up to 10 gigaHertz for 10 serial input lines at speeds of 1 gigaHertz each.

FIG. 11b indicates the input and output bandwidths that can be achieved by a high speed router 1104 configured with SRAM devices 300, 330 (FIGS. 3a, 3b) in accordance with the present invention. The router 1104 has an internal storage capacity (in time) similar to router 1102 in FIG. 11a, however, router 1104 achieves input and output bandwidths up to 100 gigaHertz for 10 serial input lines at speeds of 3.125 gigaHertz each. In some embodiments, routers 1102, 1104 can store 300 milliseconds of data before they overflow, however, the internal memory storage capacity of router 1104 (FIG. 11b) is an order of magnitude larger than router 1102 (FIG. 11a).

Referring again to FIGS. 3a, 3b, and 4, SRAM devices 300, 330 configured in SRAM series 400, 401 can be used to provide cost effective and scalable memory for high-speed routers 100 and other equipment that utilizes SRAM. SRAM devices 300, 330 achieve efficient data transfers with even very small data packets (e.g., 4 byte packet read). Further, the storage capacity of SRAM series 400, 401 can be increased without requiring an increase in the number of pins on ASIC 202 and switch 208.

The ability to scale the memory capacity and bandwidth while using the same ASIC 202 and switch 208 alleviates problems associated with integrating new ASICS having an increased number of pins for more bandwidth, as found in the prior art. The SRAM series 400, 401 allow additional SRAM devices 300 to be added to SRAM series 400, 401 without incurring board layout problems. Such problems can include attempting to position components to avoid long data bus lines, routing wide data bus lines to memory and processor devices with a large number of pins, and multi-drop connections on all busses.

The requirement of transferring a minimum of five bytes to initiate a READ or a WRITE command allows the internal architecture of SRAM devices 300, 330 to process READ commands and WRITE commands in parallel. As a result, the internal bandwidth of the SRAM devices 300, 330 can be greatly reduced from the external bandwidth. This allows a significant reduction in power dissipation and a reduction in the required internal memory access speed. Embodiments of SRAM devices 300, 330 which require additional latency from the initiation of the READ command to the availability of the data, could be developed using DRAM technology.

SRAM devices 300, 330 configured in SRAM series 400, 401 also alleviate address fan-out problems because each SRAM series 400, 401 has only one write input port 402 and one read output port 404 that interfaces with ASIC 202. Further, SRAM series 400, 401 alleviate noise issues that arise with heavy bus loading and drivers, line termination, bus contention, and long data bus lines found in the prior art. A further advantage with SRAM series 400, 401 is that there are no logistical problems with bus arbitration, transferring small amounts of data on very wide busses, bottlenecks at the memory interface, and bus/clock skew and bit alignment.

One skilled in the art will recognize the many teachings of this disclosure and be able to apply these teachings to additional embodiments and, indeed, to other kinds of devices, as well, without departing from the teachings of this disclosure. Consequently, the scope of the invention should not be inferred as being limited by the exemplary embodiments described herein, but rather should be viewed as teaching in the art far greater than just these exemplary embodiments. Accordingly, other embodiments, variations, and improvements not described herein are not necessarily excluded from the scope of the invention.

What is claimed is:

1. A random access memory device comprising:
 a random access memory module;

a write input port coupled to receive packets that include data and command information; a decoder coupled to receive the packets from the write input port, and to access the
random access memory module to perform the commands in the packets;
a read input port operable to receive bypass data; and
a read output port coupled to output the bypass data and data read from the random access memory module.

2. The random access memory device of claim 1 further comprising:
a write output port coupled to receive the packets from the write input port and to transmit the packets to another random access memory device.

3. The random access memory device of claim 2 further comprising: a buffer coupled between the write input port and the write output port.

4. The random access memory device of claim 2 further comprising:
a decoder coupled between the write input port and the write output port; and
an encoder coupled between the decoder and the write output port.

5. The random access memory device of claim 4, further comprising:
a first multiplexer coupled between the read input port and the read output port; and
an idle signal coupled to the first multiplexer, wherein the first multiplexer is operable to output the idle signal when the read input port is not transmitting the bypass data to the read output port.

6. The random access memory device of claim 5 further comprising:
a second multiplexer coupled between the random access memory module and the read output port, the second multiplexer being further coupled to receive the output of the first multiplexer, wherein the second multiplexer is operable to output the output of the first multiplexer when read data is not being transmitted from the random access memory module.

7. The random access memory device of claim 6 further comprising:
an encoder coupled between the second multiplexer and the read output port.

8. The random access memory device of claim 5, wherein the decoder includes a phase lock loop, the random access memory device further comprising:
a second decoder coupled between the read input port and the first multiplexer, wherein the second decoder includes a delay lock loop.

9. The random access memory device of claim 1, further comprising:
a first multiplexer coupled between the read input port and the read output port; and
an idle signal coupled to the first multiplexer, wherein the first multiplexer is operable to output the idle signal when the read input port is not transmitting the bypass data to the read output port.

10. The random access memory device of claim 9, further comprising:
a second multiplexer coupled between the random access memory module and the read output port, the second multiplexer being further coupled to receive the output of the first multiplexer, wherein the second multiplexer is operable to output the output of the first multiplexer when read data is not being transmitted from the random access memory module.

11. The random access memory device of claim 10 further comprising:
an encoder coupled between the random access memory module and the second multiplexer.

12. The random access memory device of claim 10 further comprising:
a buffer coupled between the second multiplexer and the read output port.

13. An apparatus comprising:
a first processing unit operable to receive serial data input;
a switch operable to receive data to be transmitted;
a first random access memory device serially coupled to the first processing unit via a write input port, wherein the first processing unit is operable to transmit data packets to the first random access memory device via the write input port;
a second random access memory device serially coupled to the first random access memory device, the second random access memory device being further coupled to transmit the data to be transmitted to the switch.

14. The apparatus of claim 13, further comprising:
a plurality of random access memory devices coupled between the first random access memory device and the second random access memory device forming a series of random access memory devices, wherein each of the plurality of random access memory devices in the series includes:
a random access memory module;
a write input port coupled to receive packets that include data and commands, and to access the random access memory module to perform the commands in the packets;
a read input port operable to receive bypass data; and
a read output port coupled to output the bypass data read from the random access memory module.

15. The apparatus of claim 14 wherein each random access memory device further comprises:
a write output port coupled to receive the packets from the write input port and to transmit the packets to one of the other random access memory devices.

16. The apparatus of claim 15 wherein each of the plurality of random access memory devices is coupled in series with another of the plurality of random access memory devices.

17. The apparatus of claim 16 wherein the write output port of each of the plurality of random access memory devices is coupled to the write input port of next of the series of the plurality of random access memory devices.

18. The apparatus of claim 17 wherein the read output port of each of the plurality of random access memory devices is coupled to the read input port of next of the series of the plurality of random access memory devices.

19. The apparatus of claim 16 wherein each random access memory device is operable to generate an overflow signal to indicate to the next random access memory device in the series that the data to be written or be read is a continuation from the previous random access memory device.

20. The apparatus of claim 19 wherein each random access memory device is operable to generate a command signal to indicate to the next random access memory device in the series that the continuation of data is to be written or read.

21. The apparatus of claim 16, further comprising:
a plurality of serial data inputs; and a plurality of the series of the random access memory devices is dedicated to handling data from one of the plurality of serial data inputs.

22. The apparatus of claim 13 wherein the random access memory devices are operable to decode the data packet and determine whether the data packet includes at least one of: a start of frame field; a control word; an address field; a data field; and an idle indicator.

23. The apparatus of claim 22 wherein the control word includes at least one of: a command to be performed; and the random access memory device perform the command.

24. A method for routing data comprising:
receiving serial data input in a first processing unit;
generating a data packet based on the serial data input;
transmitting the data packet to a first random access memory device via a write input port;
decoding the data packet;
determining whether to perform a command in the first random access memory device based on information in the data packet; and
transmitting the data packet to a second random access memory device, wherein a write input port of the second random access memory device is coupled in series to the write output port of the first random access memory device.

25. The method of claim 24 further comprising:
determining whether to perform a command in the second random access memory device based on the information in the data packet.

26. The method of claim 24 further comprising:
coupling a plurality of random access memory devices in series between the first random access memory device and the second random access memory device, wherein each of the plurality of random access memory devices includes a write input port, a write output port, a read input port, and a read output port;
transmitting the data packet from the first random access memory device to each random access memory device, wherein the write output port of each random access memory device is coupled in series to the write input port of the next random access memory device; and
determining whether to perform a command in each random access memory device based on the information in the data packet.

27. The method of claim 26 wherein the read output port of each random access memory device is coupled to the read input port of the next random access memory device in the series.

28. The method of claim 27 further comprising:
generating an overflow signal in one of the plurality of random access memory devices to indicate to the next random access memory device that a write command or read command is being continued from the one of the plurality of random access memory devices.

29. The method of claim 28 further comprising:
generating a command signal to indicate to the next random access memory device whether a read command or a write command is being continued.

30. The method of claim 26, further comprising:
generating an idle signal in at least one of the random access memory devices;
multiplexing the idle signal with a bypass data signal from the read input port of the at least one random access memory device to generate a first mux signal, wherein the idle signal is output when the read input port is not transmitting bypass data to the read output port of the at least one random access memory device.

31. The method of claim 30 further comprising:
multiplexing the first mux signal with a data signal from a SRAM module in the at least one random access memory device to generate a second mux signal, wherein the second mux signal is set to the first mux signal when read data is not being transmitted from the random access memory module, otherwise the second mux signal is set to the data signal.

32. The method of claim 31 further comprising: suspending transmission of the bypass data to transmit read data from the SRAM module in the at least one random access memory device.

33. The method of claim 32 further comprising:
encoding the read data from the SRAM module.

34. The method of claim 30, further comprising:
correcting the phase of the bypass data.

35. The method of claim 30, further comprising:
clocking the read output port and the write output port of the at least one random access memory device using a phase lock loop; and
synchronizing the read input port of the at least one random access memory device using a delay lock loop.

36. The method of claim 24 further comprising:
determining whether a control word in the data packet includes at least one of: a start of frame field; a control word; an address field; a data field; and an idle indicator.

37. The method of claim 36 further comprising:
determining whether the control word includes at least one of: a command to be performed; and an identifier of the random access memory device to perform the command.

38. The method of claim 24 further comprising:
buffering the data packet at the write output port.

39. The method of claim 24 further comprising:
terminating performance of a first write command when a second write command is received.

40. The method of claim 24 further comprising:
suspending performance of a write command when a read command is received.

41. The method of claim 24, further comprising:
buffering data being output to the read output port.

42. An apparatus for routing data comprising:
means for receiving serial data input in a first processing unit;
means for generating a data packet based on the serial data input;
means for transmitting the data packet to a first random access memory device via a write input port;
means for decoding the data packet;
means for determining whether to perform a command in the first random access memory device based on information in the data packet; and
means for transmitting the data packet to a second random access memory device, wherein a write input port of the second random access memory device is coupled in series to a write output port of the first random access memory device.

43. The apparatus of claim 42 further comprising:
means for determining whether to perform a command in the second random access memory device based on the information in the data packet.

44. The apparatus of claim 42 further comprising:
means for transmitting the data packet to each of a plurality of random access memory devices coupled in series between the first random access memory device and the second random access memory device, wherein the write output port of each random access memory device is coupled in series to the write output port of each random access memory device, and a read output port of the second random access memory device is coupled to a switch processing unit; and determining whether to perform a command in each random access memory device based on the information in the data packet.

45. The apparatus of claim 44 wherein a read output port of each random access memory device is coupled to a read input port of the next random access memory device in the series.

46. The apparatus of claim 45 further comprising:
means for generating an overflow signal in each of the random access memory devices to indicate to the next random access memory device that a write command or read command is being continued from the previous random access memory device.

47. The apparatus of claim 46 further comprising:
means for generating a command signal in each of the random access memory devices to indicate to the next random access memory device whether a read command or a write command is being continued.

48. The apparatus of claim 44, wherein each of the random access memory devices includes a read input port and a read output port, further comprising:
means for generating an idle signal in each of the random access memory devices;
means for multiplexing the idle signal with a bypass data signal from a read input port in each of the random access memory devices to generate a first mux signal, wherein the idle signal is output when the read input port is not transmitting bypass data to the read output port of the random access memory device.

49. The apparatus of claim 48 further comprising:
means for multiplexing the first mux signal with a data signal from an SRAM module in the random access memory device to generate a second mux signal in each of the random access memory devices, wherein the second mux signal is set to the first mux signal when read data is not being transmitted from the SRAM module.

50. The apparatus of claim 48 further comprising:
means for suspending transmission of bypass data when data is being read from a SRAM module in the random access memory device.

51. The apparatus of claim 50 further comprising:
means for encoding the read data from the SRAM module.

52. The apparatus of claim 48, further comprising:
means for correcting the phase of the bypass data.

53. The apparatus of claim 48, further comprising:
means for clocking the read output port and the write output port using a phase lock loop; and
means for synchronizing the read input port using a delay lock loop.

54. The apparatus of claim 48, further comprising:
means for buffering data being output to the read output port.

55. The apparatus of claim 42 further comprising:
means for determining whether the data packet includes at least one of: a start of frame field; a control word; an address field; a data field; and an idle indicator.

56. The apparatus of claim 55 further comprising:
means for determining whether the control word includes at least one of: a command to be performed; and an identifier of the random access memory device to perform the command.

57. The apparatus of claim 42 further comprising:
means for buffering the data packet at the write output port.

58. The apparatus of claim 42 further comprising:
means for terminating performance of a first write command when a second write command is received.

59. The apparatus of claim 42 further comprising:
means for suspending performance of a write command when a read command is received.

60. An apparatus, comprising:
a plurality of serially connected random access memory devices, each of said plurality of random access memory devices having a write input port configured to receive data packets, each of said plurality of random access memory devices having a read output port configured to transmit data;
a processing unit serially coupled to the plurality of serially connected random access memory devices, and configured to receive serial data and to transmit a data packet to said plurality of serially connected random access memory devices; and
a switch, configured to receive data from said plurality of serially connected random access memory devices.

61. The apparatus of claim 60, wherein at least one of said plurality of serially connected random access memory devices further comprises a read input port, configured to receive data from said read output port of another of said plurality of serially connected random access memory devices.

62. The apparatus of claim 60, wherein at least one of said plurality of serially connected random access memory devices further comprises a write output port, configured to receive data from said write input port of said at least one of said plurality of serially connected random access memory devices, further configured to transmit data to the write input port of another of said plurality of serially connected random access memory devices.

63. The apparatus of claim 62, wherein data transmitted from said write output port of said at least one of said plurality of serially connected random access memory devices is synchronized with data transmitted from said read output port of said at least one of said plurality of serially connected random access memory devices.

64. The apparatus of claim 60, wherein data is stored in one of said plurality of serially connected random access memory devices upon execution of a write operation, and wherein stored data may be subsequently read from said one of said plurality of serially connected random access memory devices upon execution of a read operation.

65. The apparatus of claim 64, wherein a read operation may be performed on one of said plurality of serially connected random access memory devices at the same time a write operation is performed on another of said plurality of serially connected random access memory devices.

66. The apparatus of claim 60, wherein said data packet includes a read command and a write command.

* * * * *